Aug. 27, 1929.  F. X. LAUTERBUR ET AL  1,726,033
DOUGH MIXER
Filed Aug. 25, 1926   2 Sheets-Sheet 2
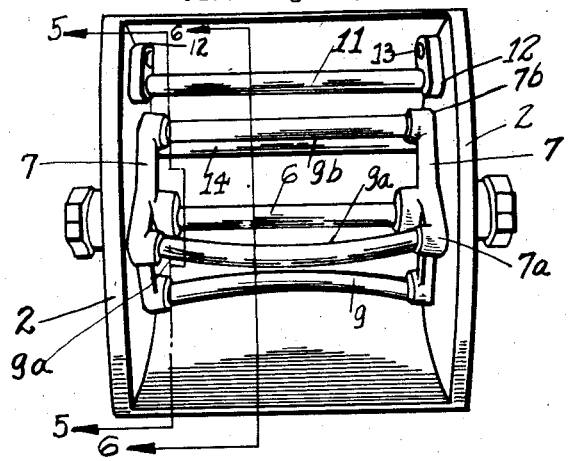
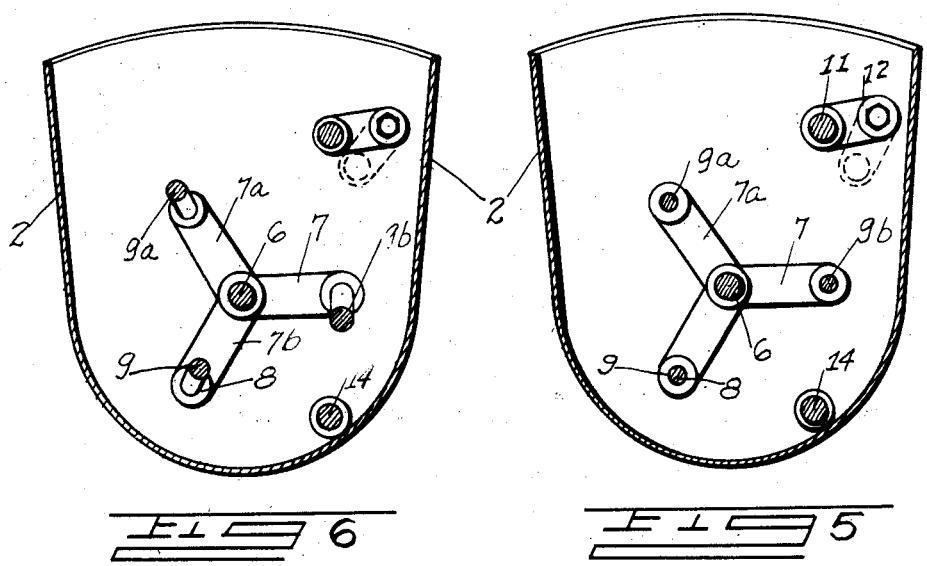
INVENTOR.
Frank X Lauterbur
Edward J Lauterbur
BY
Allen & Allen
ATTORNEY.

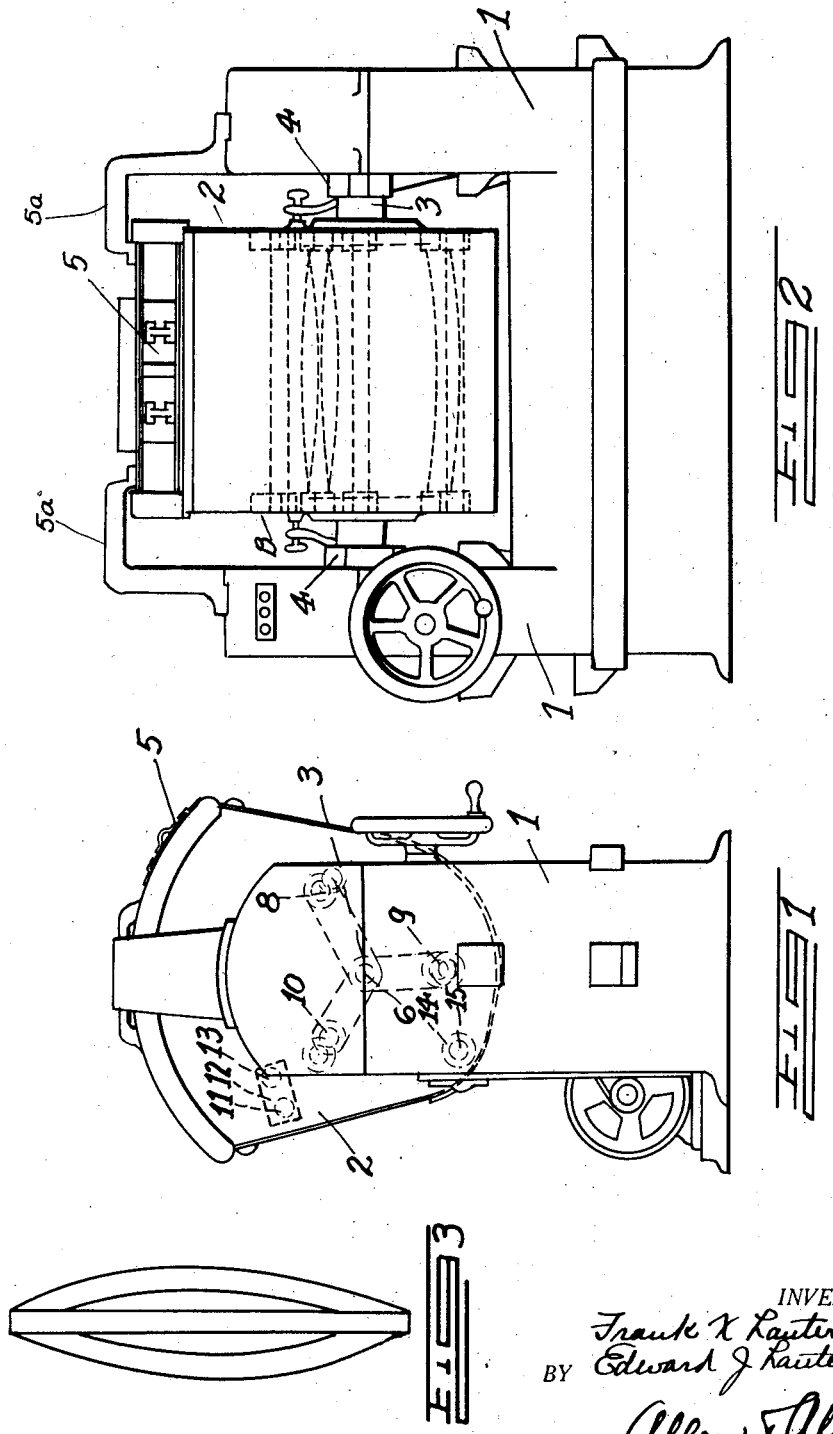

Patented Aug. 27, 1929.

1,726,033

UNITED STATES PATENT OFFICE.

FRANK X. LAUTERBUR AND EDWARD J. LAUTERBUR, OF SIDNEY, OHIO.

DOUGH MIXER.

Application filed August 25, 1926. Serial No. 131,478.

Our invention relates to machines for mixing dough in preparation for the making of bread and other products, and has as its prime object the thorough incorporation and working of batches of dough so as to cause the proper development of gluten, at the minimum of mixing time, and with the minimum of heat of friction produced in the mass.

The type of mixer employed by us is preferably the standard dough mixer bowl having a curved bottom and straight ends and sides, within which bowl the mixer blades are caused to revolve about an axis which is preferably at substantially the center of curvature of the base of the bowl.

The aim of our structure is to accomplish a very thorough mixing of the dough, while keeping it away from the ends, sides and bottom of the bowl, thus eliminating rubbing and consequent heat, and permitting a rapid movement of the blades without danger to the batch, and to accomplish this with mixing blades which are evenly balanced so that there is a minimum of strain on the operating parts, and so that vibration of the mechanism is reduced to a minimum.

Considering the ingredients as resting in the bottom of the mixing bowl, our structure, arrangement and operation of the mixing bars results in working the dough in and out alternately to the maximum degree at the central cross vertical plane of the bowl, and intermediate these two workings forcing the dough inwardly from the ends of the bowl by means of blades which also cause a spinning action on the dough that is most rapid at the outside of the batch. With mixing bars operating in this manner, and a retarder to constrict the dough mass and hold it back at the point of entrance of the blades into the mass, together with a rotating roll in the bottom of the bowl to lift the mass away from the bowl base, and provide another constricted line, without excess friction on the dough, we obtain a mixing which is effective in the highest degree with the minimum of deleterious results. Thus, as a typical test, we can dump a pound of lamp black into a full sized baker's mixer filled with a normal dough batch, and completely blacken all parts of the batch within one minute of mixing time by the use of our invention, without the development of excess heat, and with hardly appreciable vibration.

We preferably employ a set of spiders, each having three arms, and so set the cross blades between the spiders, that each beating unit, consisting of two spider arms and a blade, has just the same thrust against the operating spindle and bearings as the other units.

In our preferred embodiment, which will be described, we provide two of the blades as alternately bent from the ends inwardly and outwardly toward the axis of the mixing element, and in radial planes passing through the axis, and the third blade is bent from the ends toward the middle in a plane tangential to the path of rotation, with the bend pointing away from the direction of rotation.

We are aware that the art is full of various kinds of mixing agitators, but know of none, in which the mode of operation is similar to that of our mechanism, such as is briefly above outlined, or in which the various problems which severely limit the possible manipulations of a dough batch are so effectively provided for.

We accomplish our objects by that certain construction and arrangement of parts to be hereinafter more specifically pointed out and claimed.

In the drawings:—

Figure 1 is an end view of the assembly.

Figure 2 is a side elevation of the assembly shown in Figure 1.

Figure 3 is a diagram illustrating the mode of operation of the device.

Figure 4 is a plan view of the preferred arrangement of blades.

Figure 5 is a vertical section taken along the line 5—5 of Figure 4.

Figure 6 is a vertical section taken along the line 6—6 of Figure 4.

Generally indicated at 1 is the frame of the machine on which are mounted the usual actuating devices which cause the rotation of the agitator shaft of the machine. These are not specifically described, as they form no part of our invention. The agitator bowl 2 has trunnions 3, which are pivotally mounted in the journals 4 in the machine frame. The bowl has an open top, which is covered by a cover plate 5, which is preferably slidably mounted and held by brackets 5ᵃ, so that it may stand in one position while the bowl is rocked over to reveal the contents thereof. In the type of machine illustrated, the bowl is U shaped with the trunnions extending from the ends of the bowl. A central shaft 6 extends through the ends of the bowl, and the shaft is connected in the usual manner, with suitable actuating mechanism supported in the frame for rotating the shaft.

In the preferred construction, the shaft 6 has end spiders thereon within the bowl, which mount the agitating bars. The spider arms 7 and 7ª, are of equal length and weight, and the third bar 7ᵇ is slightly shorter. The bars 7 are connected across the span of the shaft by means of curved agitator bar 9, which curves inwardly in substantially a plane that bisects the axis of the beater shaft. The bars 7ª are connected by a like agitator bar 9ª, which, however, is set so that it curves outwardly in said plane. The bars 7ᵇ are connected by a like bar 9ᵇ, which extends in a curve away from the direction of motion of the beater shaft, in a plane tangential to the path of motion of the spiders.

When this special agitator is revolved, the action on a mass of dough is as graphically shown in Figure 3. Leaving out of consideration the effect of each bar churning the dough in a circular path, the bar 9 pushes in on the dough, the bar 9ª pushes out on the dough, and the bar 9ᵇ, pushes the dough from the ends of the bowl toward the middle.

The breaker bar 11 is mounted on brackets 12, which are disposed adjacent the ends of the bowl with bolts 13, which enable the brackets to pivot so as to carry the breaker bar to a desired position with relation to the side wall of the mixer and the top level of the dough and path of movement of the agitator or beater bars.

In the base of the bowl, we mount a retarding roll. In the particular type noted, there is a shaft 15 extending across the bowl on which is mounted a rotatable sleeve 14.

In operation, the bowl is filled with a batch to be made into dough, and the blades are set into operation, with the lid closed over the bowl. The dough is worked up and mixed with about the following actions taking place in addition to the imparting of circular or spinning motion. As each blade approaches the breaker bar, the dough is kept from being forced against the bowl wall, and tends to stay outside of the breaker bar. Thus there is compression of the dough at this point, but without the hurtful action of developing much friction against the vertical wall of the bowl. As each blade approaches the bar at the bottom of the bowl, the dough is again given an extra pressure, but rolls over the bar without being pressed against the bottom of the bowl, thus developing hurtful friction.

The action of the bars due to their special shape, has been noted, and it may be added that the working is first inwardly from the wall of the bowl toward the beater shaft, greatest at the center of the bowl, then outwardly toward the wall, greatest at the center, and finally inwardly from the ends of the bowl, parallel to the plane of the bowl wall toward the center. The two bars fixed to the bowl wall serve a distributing function of spreading the dough out, since they are parallel.

The arms 9 and 9ª, balance each other, and the length of the arms 7ᵇ, together with the bar 9ᵇ, brings the center of gravity of this element of the spider to substantially the same, as the other two bars and spider arms.

The spider and beater bars are thus equally balanced, which rids the machine of vibratory tendency. Furthermore, the bars are the same in each case, so far as manufacturing them are concerned, and are set in place in the spider arms in a different manner to give the proper agitation.

The amount of heat developed by friction when the machine is operated rapidly is much smaller than any machine, having the general type illustrated, has ever shown to our knowledge. This permits a more rapid action, as does the balance of the agitator.

The working in and out, greatest at the center of the mass, and in from the ends to the center, particularly when taken together with the several abutment bars in the bowl itself, results in the high degree of effectiveness which we find our machine to possess.

We do not insist upon a shape of bar which is identical with the form that we have illustrated, so long as the tendency of working is as described, resulting in a very perfect balance in the operation, and a minimum of wiping against the sides of the bowl to develop friction with a maximum of intermixture and agitation of all parts of the mass.

The retarding rolls or bars which serve kneading and stretching functions in connection with the agitator arms, must be of substantial size as distinguished from ribs or roughened portions in the bowl walls. Also it is required that at least for the upper bar, they be adjustable with relation to the bowl wall so as to control the spacing of the periphery of the bar from the bowl wall. The rolls or bars must remain in fixed position of adjustment, however, in order to serve their function.

Thus the required function of the upper bar is that it be of a size sufficient to engage the whole mass of dough that is brought around by the revolution of the agitator device. It must co-operate with the agitator bars so that an area of constriction is created between each bar and the said upper roll or bar, as the revolution takes place. When the dough has developed far enough to begin to stretch and remain a coherent mass carried around with the agitator, the upper bar must provide that the mass is kept away from the inner wall of the bowl while being stretched and worked.

Without considerable size, the upper roll or bar could not serve these functions which are somewhat analogous to those of a shelf onto which the dough is flung, and from which it is withdrawn, in a downward direction free to a substantial degree from such contact with the bowl wall as to develop heat and friction. Also, referring to the particular nature of agitator bar used by us, the dough is worked against the shelf by pressure applied more closely at some points than others, and the said upper roll or bar must be of sufficient size to function with the agitator bars as an abutment against which individual working actions are initiated, at each entrance of the agitator bar into the partially suspended, accumulated and retarded mass.

The same requirements for size are present in the lower retarding rolls or bars, since the functions developed are quite similar to those of the upper roll. The dough mass spun worked and stretched away from the upper roll, stays practically clear of the bowl wall until it is again held up and worked and stretched so as to repeat the action above fully described for the upper roll. Thus the action of the lower roll is again such as will keep the dough mass away from frictional contact with the bowl wall during its upward area of movement.

The lower roll as noted should have a rotary surface or be revolubly mounted, so that it will permit the dough mass to readily pass up over the top between the roll and the agitator device. This cuts down friction while at the same time keeping the dough away from the bowl walls, and imparting a lower zone of stretching similar to the upper zone.

It is of importance to consider our invention from the point of view of high speed mixing of dough more particularly, although it is not limited to this one aspect.

The operation of the machine at high speeds can be resorted to in the bakery without increase of temperature of the mass to such a degree as would interfere with the action of the elements of fermentation. In other words the development of heat is insufficient to result in overheating by the time the batch is finished. Also there is a notable aeration of the dough and a much improved tough gluten development, and our machine has the opposite effect of the use of cleats or roughened elements in the base of the mixer bowl, since the effect of the several stretcher or breaker bars is to cut down tearing action on the dough, keep it away from the bowl walls, and hold it in relation to the agitator bars in such a way that the dough is spun or stretched over the bars.

Tests have shown that fermentation period is cut nearly one-third the usual time in the bakery by our new type machine, and less sugar and yeast foods are required. The gluten being tougher makes a better keeping loaf, and expands more in the baking, giving a larger loaf. The dough inside the loaves or "crumb" as it is called, is whiter because of the stretching without cutting and friction that is developed in our machine. There is no need for refrigeration or to use ice so far as the mixer is concerned, and the nature of the curved bars of the agitator is such, as in co-operation with the stretching, and retarding and bowl clearing rolls, as to give a greater agitation per unit of mixing time than has ever been accomplished in our experience.

The machine is easy to clean because the agitator bars do not come close to the bowl walls and the balance of the agitator, and effect of the top stretching and retarding roll to cut down slap of the dough mass against the bowl wall due to centrifugal force, results in a machine with hardly any appreciable period of vibration when working or idle.

Having thus described our invention, what we claim as new and desire to secure by Letters Patent is:—

1. In a dough mixer, an agitating element formed by means of rotated spiders connected across the bowl with arms, said arms being bent alternately so that the middle of one projects toward the agitator axis of rotation, the middle of another projects away from the agitator axis of rotation, and the third projects substantially tangential to its path, and at its middle extends away from the direction of rotation.

2. In a dough mixer, a revolving mixer formed of spider arms, and blades connecting them across the bowl, said blades being bowed, one counter to the direction of the axis of the mixer to force the dough in toward the middle of the bowl, one in the direction of the axis of the mixer to force it out from the middle of the bowl, and one counter to the direction of movement of said arms to force it inwardly from both ends of the bowl toward the middle.

3. In a dough mixer having a bowl, and a revolving mixer formed of spider arms, and blades connecting them across the bowl, said blades being bowed, one counter to the direction of the axis of the mixer to force the dough in toward the middle of the bowl, one in the direction of the axis of the mixer to force it out from the middle of the bowl, and one counter to the direction of movement of said arms to force it inwardly from both ends of the bowl toward the middle, and a plurality of bars fixed with relation to the bowl, and extending across the bowl to engage evenly across the mass.

4. In a dough mixer, the combination with a bowl of an agitator therein, said agitator having means for enforcing a circular movement on the dough and a movement away from the ends of the bowl, at all times, a cross element held in the bowl adjacent the side thereof, said element during the operation of the mixer having a fixed axis and so located as to engage the dough at approximately the upper limit of the path of the agitator within the bowl.

5. In a dough mixer, the combination with a bowl of an agitator therein, said agitator having means for enforcing a circular movement on the dough and a movement away from the ends of the bowl, at all times, and an adjustable cross element held in the bowl adjacent the side thereof, and located to engage the dough at approximately the upper limit of the path of the agitator within the bowl.

6. In a dough mixer, the combination with a U-shaped bowl, and a rotary agitator tending to cause a circular movement of dough in the bowl, of at least one breaker or stretching bar adjustably mounted in the bowl so as to extend across the interior at approximately the level which agitator traverses at the upper limit of its movement within the bowl.

7. In a dough mixer, the combination with a U-shaped bowl, and a rotary agitator tending to cause a circular movement of dough in the bowl, of at least one breaker bar adjustably mounted in the bowl so as to extend across the interior at approximately the level which the agitator traverses at the upper limit of its movement within the bowl, and at least one retarding element within the bowl, located adjacent the base thereof.

8. In a dough mixer, the combination with a U-shaped bowl, and an agitator tending to cause a circular movement of dough in the bowl, of at least one breaker bar adjustably mounted in the bowl so as to extend across the interior at approximately the level which the agitator traverses at the upper limit of its movement within the bowl, and at least one retarding element within the bowl, located adjacent the base thereof, said retarding element having a rotatable body extending substantially in alignment with the axis of rotation thereof, so as to give with the impulse of the dough against it in a rotary direction.

9. In a dough mixer, the combination of a U shaped bowl, means to impart a movement circularly of the bowl, accompanied by a plurality of movements other than circularly of the bowl, to the dough held therein, and constituting a rotary agitator, and bars above and below the axis of the agitator opposing the tangential impulse of the circular movement imparted to the dough by the agitator.

10. In a dough mixer, the combination of a U shaped bowl, means to impart a movement circularly of the bowl, accompanied by a plurality of movements other than circularly of the bowl, to the dough held therein, and constituting a rotary agitator, and means in the bowl opposing the tangential impulse of the circular movement imparted to the dough by the agitator, said means being located in the path of the agitator so as to oppose the dough movement at the point of entrance of the agitator elements into the dough from above, and adjacent to the low point within the bowl of the agitator elements.

11. In a dough mixer, the combination of a U shaped bowl, means to impart a movement circularly of the bowl, accompanied by a plurality of movements other than circularly of the bowl, to the dough held therein, and constituting a rotary agitator, and means in the bowl opposing the tangential impulse of the circular movement imparted to the dough by the agitator, said means being adjustable in its position with relation to the bowl wall, and located adjacent the line of entry of the elements of the agitator into the dough mass within the bowl from above.

12. In a dough mixer, the combination of a U shaped bowl, means to impart a movement circularly of the bowl and movement other than circularly thereof, to the dough held therein, and constituting a rotary agitator, and means in the bowl and adjustably spaced away from the sides thereof, located so as to engage the mass of dough across the bowl at a point where the elements enter the dough from above.

13. An agitator for mixer bowls, having end terminal members for mounting the agitator bars, at least three agitator bars set in said end terminal members, said bars being differently bowed so that each traverses a different path through a mass being agitated thereby, and said terminal members and bars so proportioned and weighted that irrespective of the paths traversed, said members and bars are equally balanced with relation to the axis of the agitator, thus preventing vibration when said agitator is revolved.

14. In a high speed mixer, the combination of a bowl having a curved bottom and substantially straight sides, and a rotary agitator having bars extending across the bowl, of elements within the bowl located at intervals in the path of the agitator, and of substantial size so as to delay the movement of the dough mass without frictionally retarding it, said elements comprising at least one axially revoluble retarding roll having an outer periphery revoluble by engagement with the ingredients mixed with the mixer and one breaker bar adjustably mounted so as to be adjustable to a desired position with respect to a dough mass in said mixer.

15. In a dough mixer, the combination with a U shaped bowl, and an agitator having interspaced bars extending across the interior of the bowl, of at least one breaker bar adjustably mounted in the bowl so as to extend across the interior at approximately the level which the bars of the agitator traverse at the upper limit of their movement within the bowl, and at least one retarding element within the bowl, located adjacent the base thereof.

16. In a dough mixer, the combination with a U shaped bowl, and an agitator having interspaced bars extending across the interior of the bowl, of at least one breaker bar adjustably mounted in the bowl so as to extend across the interior at approximately the level which the bars of the agitator traverse at the upper limit of their movement within the bowl, and at least one retarding element within the bowl, located adjacent the base thereof, said retarding element having a rotatable body, so as to give with the impulse of the dough against it in a rotary direction.

17. In a mixer, a U shaped bowl, an agitator therein tending to move the dough around within the bowl, and means for keeping the dough away from the U shaped bowl walls during its movement under impulse of the agitator, said means comprising a revolving roll element near the base of the bowl, and a cross element spaced away from the bowl and so located as to act as a shelf to hold back the dough from being flung centrifugally against the U shaped bowl wall.

18. In a mixer a bowl having a curved wall, an agitator formed of bars extending across the bowl, and moving in one direction of rotation within the bowl, and a plurality of stretching members located adjacent the bowl wall and formed at least in part of rotatable cylindrical members so as not to develop a friction against the dough and to lift dough which comes into centrifugal contacts therewith away from the bowl wall.

FRANK X. LAUTERBUR.
EDWARD J. LAUTERBUR.